Dec. 1, 1959           G. A. LYON           2,915,424
METHOD OF MAKING CARTRIDGE CASES AND LIKE ARTICLES
Filed Nov. 5, 1952           5 Sheets-Sheet 1
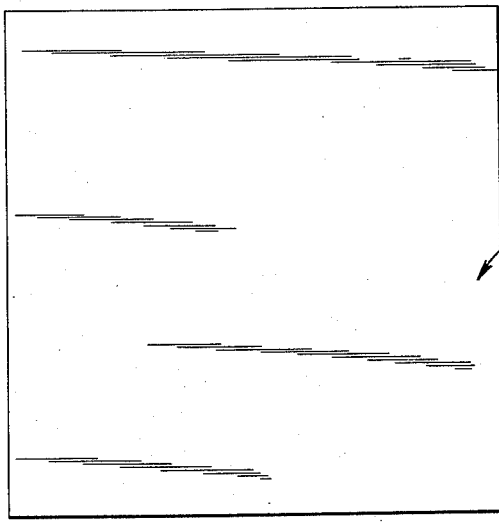
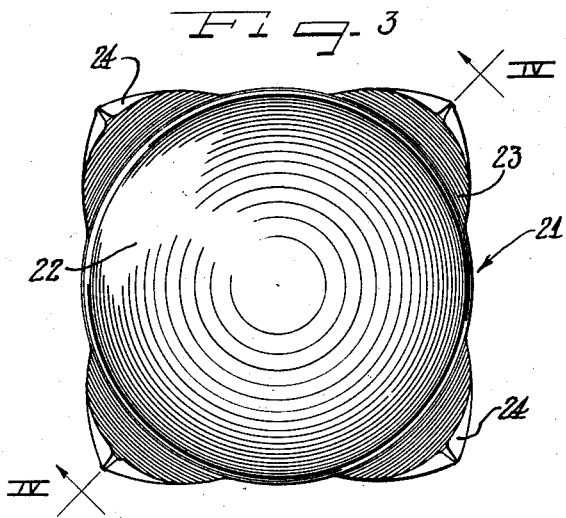
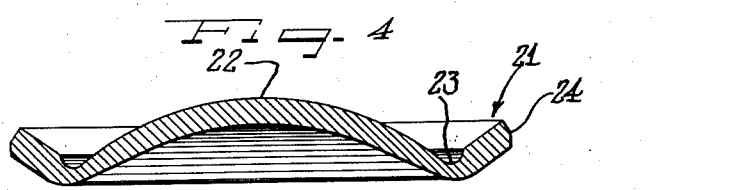
George Albert Lyon

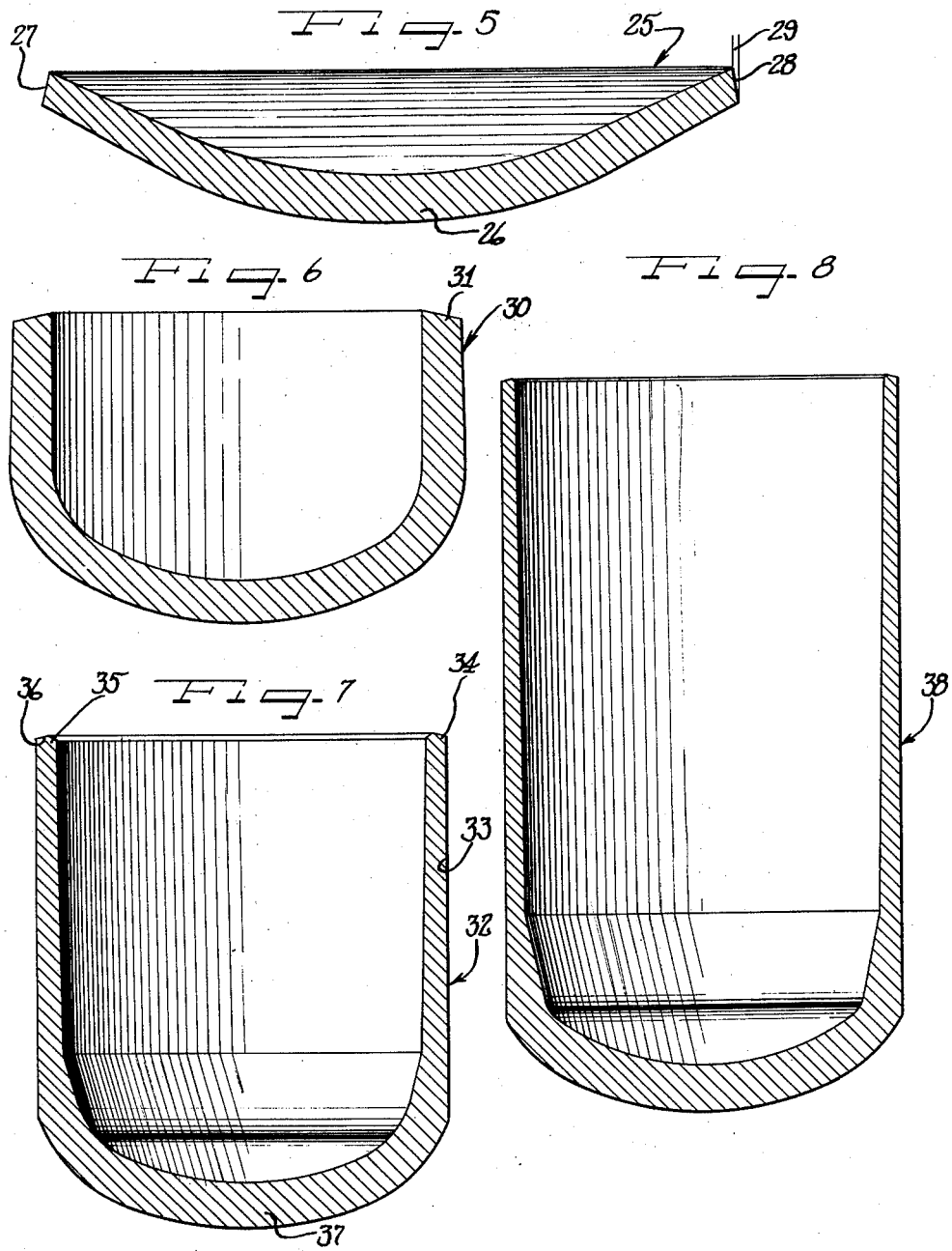

Dec. 1, 1959  G. A. LYON  2,915,424
METHOD OF MAKING CARTRIDGE CASES AND LIKE ARTICLES
Filed Nov. 5, 1952  5 Sheets-Sheet 3
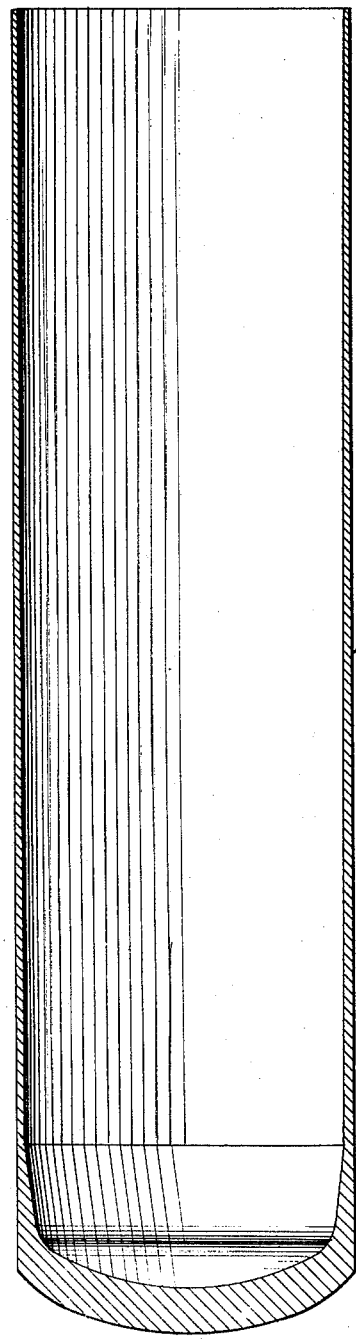
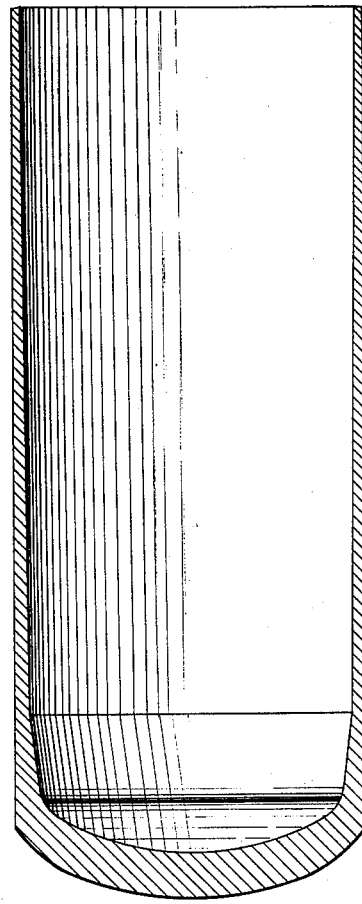
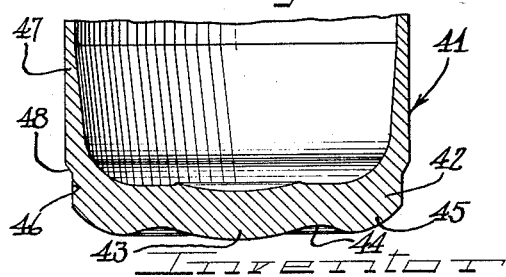
George Albert Lyon

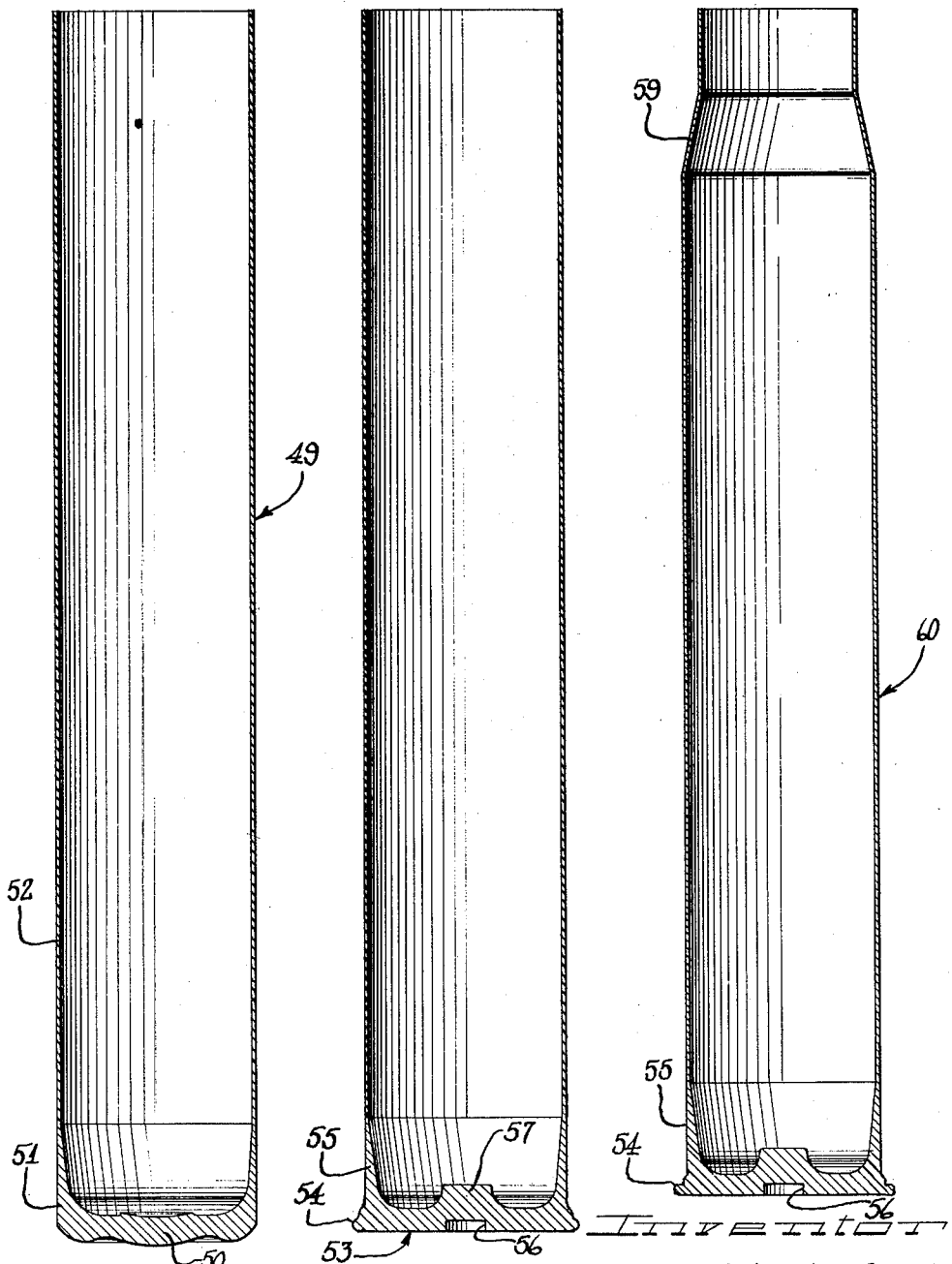

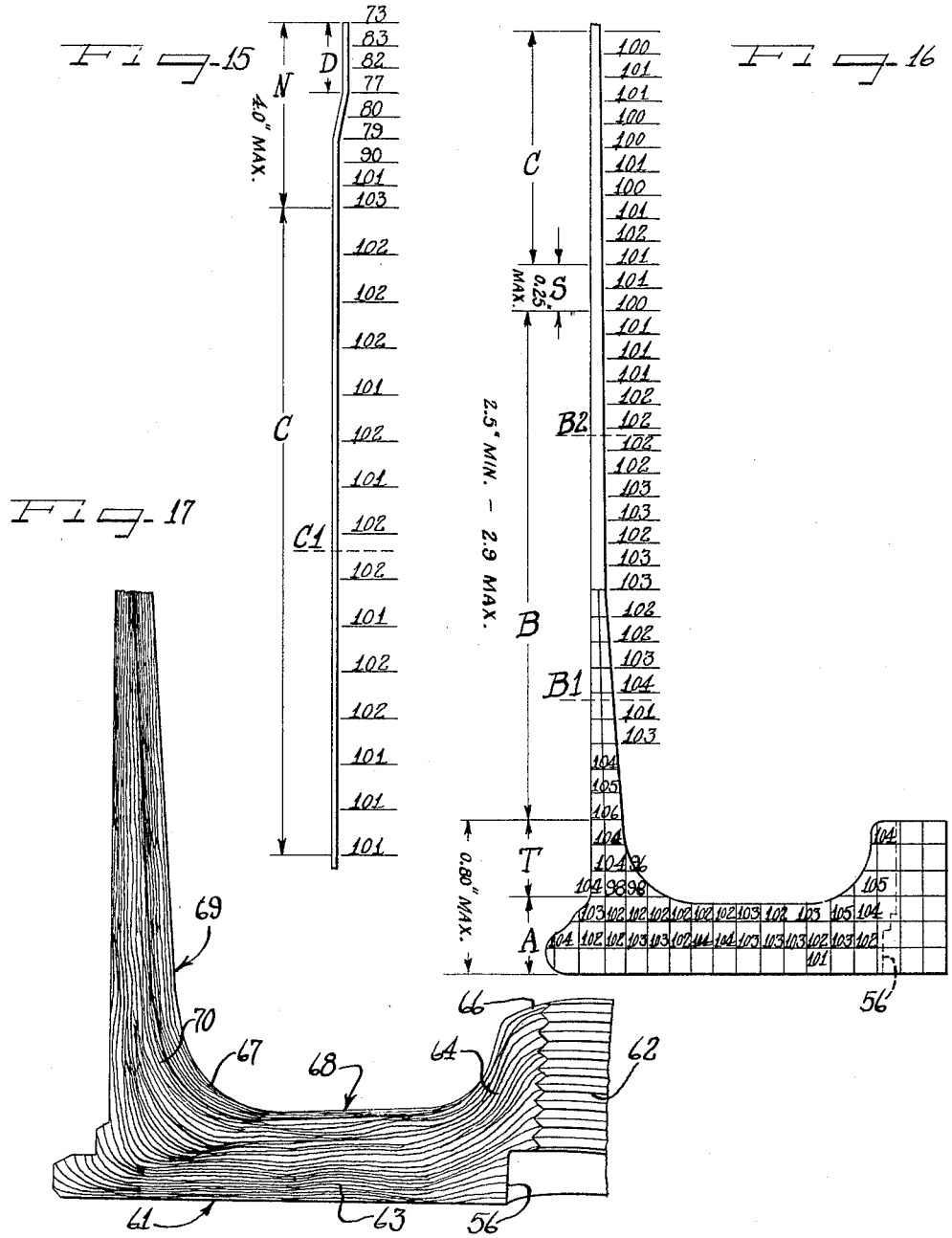

United States Patent Office 2,915,424
Patented Dec. 1, 1959

2,915,424

METHOD OF MAKING CARTRIDGE CASES AND LIKE ARTICLES

George Albert Lyon, Detroit, Mich.

Application November 5, 1952, Serial No. 318,797

13 Claims. (Cl. 148—12)

This invention relates to a method of making cartridge cases and like articles and to the articles so made.

In the making of cartridge cases from medium soft steel by a series of coining, cupping and drawing operations, it is extremely important that the steel have good drawing characteristics and also a relatively high level of hardness and of yield and tensile strength. Heretofore, a spheroidized steel has been used in the making of cartridge cases, but the spheroidizing of steel is a relatively long and expensive process and necessarily increases the cost of the final article.

Moreover, a spheroidized steel is not suited to the making of cartridge cases. As a result of spheroidizing, the carbide, or cementite, is localized in spheroids relatively widely spaced apart in a body of ferrite, which behaves as a soft cushion in subsequent drawing operations. This makes drawing easier but makes ultimate hardening more difficult, since a spheroidized steel requires a relatively long heat treatment at a hardening temperature to uniformly disperse or diffuse the carbide again through the ferrite cushion and convert the microstructure back to austenite. Such a hardening step is necessary in the case of spheroidized steel, since after the drawing and heading steps, the cartridge case is still not hard enough to stand up in the firing chamber and be left in proper condition for re-chambering.

Where, in accordance with my invention, a non-spheroidized, medium carbon steel is used, the blanks, if properly annealed to put them into a purely pearlitic state, are ductile enough to be drawn satisfactorily and yet are hard enough due to cold working in the drawing operations, so as not to require any hardening step in the final processing of the drawn and headed blanks.

A pearlitic steel has a great advantage over a spheroidized steel in that while not so ductile as a spheroidized steel, nevertheless in the unhardened condition in which both a spheroidized and a pearlitic steel would be, prior to each of the cold working steps in the making of cartridge cases, the pearlitic steel has a generally higher level of hardness with a greater yield and tensile strength than spheroidized steel and, further, has greater capabilities of being hardened by cold working than has a spheroidized steel. However, the superior capabilities of a pearlitic steel for these purposes have not been appreciated and until my present invention, it has not been considered possible to use a pearlitic steel in the making of cartridge casings. The success of my present method is, to the best of my knowledge, due to a proper correlation between the metallurgical treatment of the steel and the metal working steps, such as coining, cupping, drawing, heading and the like. By virtue of this correlation, the pearlitic steel is ductile enough to be cold worked, yet of sufficiently high hardness with a yield and tensile strength such as not to tear or rupture during the metal working steps, and not to require any heat treatment to effect hardening in the final stages of making the cartridge cases. Further, by maintaining the steel in a pearlitic state, the machining of the steel is easier than where a spheroidized steel is used.

I have now found that it is possible to start with a medium carbon steel, say of about 0.30% carbon content, in whatever condition it comes from the hot mill, or at any state in its processing, and by proper heat treatment put the steel in a purely pearlitic state, suitable as the starting material for my method. As a result of this heat treatment I not only improve its drawing characteristics, but also refine its grain size. An annealing step that includes isothermal annealing in a salt bath, or other liquid medium, has been found most satisfactory for this purpose. An S.A.E. 1030 steel having initially a grain size of from 4 to 6 can, in accordance with my method, be isothermally annealed to produce a purely pearlitic structure having a smaller grain size, preferably of between 8 and 10, and having improved drawing characteristics.

I have further found that if the steel is annealed before each cold working step by heating to within relatively narrow temperature limits, followed by quenching, the grain size can be maintained substantially the same, the drawing characteristics of the steel remain satisfactory for the subsequent cold working steps, and the hardness of the steel does not increase very substantially until, as a direct result of the final drawing step, the required hardness is obtained without the necessity of any subsequent heat treatment to effect such hardening. Thus, by closely following a predetermined sequence of annealing and cold working steps, I have found it possible to produce a cartridge case from a non-spheroidized medium carbon steel that is superior to cartridge cases heretofore produced from a spheroidized steel.

It is therefore an important object of this invention to provide an improved method of drawing steel to produce cartridge cases and the like from blanks of a medium carbon steel having a pearlitic microstructure, the method including, in proper sequence, annealing under controlled temperature conditions and reduction by cold working.

It is a further important object of this invention to provide an improved method of making cartridge cases from a medium carbon steel of pearlitic microstructure, wherein the blank is first coined and then cupped and successively drawn, all reductions being in a cold state with an isothermal anneal of the blank before coining in order to produce a purely pearlitic structure and a grain size between 8 and 10 and with annealing before the successive cold reduction steps, the annealing steps after coining and before each successive draw being carried out at a temperature such as to maintain substantially the same grain size as that resulting from the isothermal anneal and thereby improve the drawing characteristics of the steel.

It is a further important object of this invention to provide an improved cartridge case of pearlitic steel microstructure.

Other and further important objects of this invention will become apparent from the following description and appended claims.

On the drawings:

Figure 1 is a plan view of a steel blank.

Figure 2 is a side view of the blank illustrated in Figure 1.

Figure 3 is a top plan view of the blank after the coining step.

Figure 4 is a sectional view taken substantially along the line IV—IV of Figure 3.

Figure 5 is a cross-sectional view of the coin after the coined blank of Figure 4 has been trimmed to circular form.

Figure 6 is a cross-sectional view of the blank after cupping.

Figure 7 is a cross-sectional view of the blank after the first draw.

Figure 8 is a cross-sectional view of the blank after the second draw.

Figure 9 is a cross-sectional view of the blank after the third draw.

Figure 10 is a cross-sectional view of the blank after the fourth draw.

Figure 11 is a broken, fragmentary cross-sectional view of the head end of the cartridge case after a pre-heading operation.

Figure 12 is a cross-sectional view of the pre-headed blank after the fifth draw.

Figure 13 is a cross-sectional view of the blank after the final heading step.

Figure 14 is a cross-sectional view of the finished cartridge case after the neck-tapering operation.

Figures 15 and 16, together, constitute a diagrammatic illustration of the finished cartridge case, showing thereon the hardness of the various regions of the head and wall, expressed as Rockwell B hardness.

Figure 17 is a fragmentary view of the head end of the finished casing showing the grain lines in typical case made in accordance with my method.

As shown on the drawings:

The method of my invention is applied to the making of cartridge cases and the like, wherein there are a succession of cold reduction steps, including, first, coining, then cupping, and then a succession of drawing operations. While the method is described in connection with the making of cartridge cases, it will be understood that it is applicable to other similar operations that start with a medium carbon steel, or, preferably, an S.A.E. 1030 steel of a carbon content between 0.27 and 0.33% by weight. The steel, as received, may be in whatever condition it comes from the hot mill, or at any stage in its processing.

The following is the composition of a particularly satisfactory steel for my purposes:

| | Percent |
|---|---|
| Carbon | 0.32 |
| Manganese | 0.74 |
| Phosphorus | 0.014 |
| Sulphur | 0.016 |
| Silicon | 0.11 |
| Nickel | 0.01 |
| Chromium | 0.04 |
| Molybdenum | 0.014 |

The steel of the above analysis was furnished in the form of sheared blanks measuring 7¾ inches by 7¾ inches by 0.540 to 0.570 inch, weighing 9.40 pounds per blank and having a hardness of 74 to 80 Rockwell B with a higher hardness of 88 to 93 B in the vicinity of the sheared edge. This steel, as furnished, had a microstructure consisting of highly banded pearlite and ferrite with a grain size of 5 to 7, or about #6. The banding of the microstructure was due to the processing of the steel at the mill.

Before starting the coining operation, the blanks should have a relatively smooth surface, free from scale and scratches, so that if not already furnished in this condition, the blanks should be polished on both sides.

Because of the excessive banding and high shear hardness, it is also usually necessary to anneal the blanks. This annealing step may suitably be carried out by immersing the steel blanks in a salt bath at a temperature between 1525 and 1565° F., preferably at 1550° F., for ten minutes, followed by five minutes in a second bath at about 1100° F. The important thing is that the steel blanks be heated slightly above the upper critical point of the steel of the blank. In the case of S.A.E. 1030 steel, having an upper critical point of about 1495° F., a temperature of 1550° F. for the bath is optimum. As soon as the steel has reached a temperature above its critical point, or within five to fifteen minutes thereafter, it is taken from the bath and immediately immersed in a constant temperature bath maintained at a temperature between 1075 and 1125° F., preferably at 1100° F. In practice, the blanks are immersed in the first salt bath at 1550° F. for about ten minutes, and in the second salt bath at 1100° F. for about five minutes. This has been found effective in eliminating the banded structure and also in refining the grain size to between 8 and 10.

The blanks are then removed from the constant temperature salt bath and immediately quenched in hot water, as for instance in water at a temperature of 200° F. By quenching immediately, all of the oxide or scale that may be formed flakes off and leaves the metal in a state in which it is easily pickled. Examination of the thus heat treated steel reveals a purely pearlitic structure. The steel after heat treatment has a grain size of between 8 and 11, usually between 8 and 10, and has been converted from a steel that cannot be satisfactorily drawn into one that can be drawn with entire satisfaction, specifically, in the making of cartridge cases.

In addition, the heat treatment just described lowers the edge hardness of the blanks to from 83 to 84 B, and slightly raises the interior hardness to from 79 to 82 B. This latter slight increase in hardness is due to the finer microstructure that has been produced by the heat treatment.

Such a steel, as just described, is now of a pearlitic microstructure and of a grain size suitable for the first metal working step. Before coining, however, the blanks are cleaned, hot rinsed, pickled, cold rinsed, hot rinsed, coated with a satisfactory protective coating, as by means of "Bonderite No. 160," cold rinsed subjected to a hot neutralizing rinse, coated with a die-lubricating compound, such as "Bonderlube No. 235," and then dried either in an oven or in the air.

Primarily, the first metal working step comprises subjecting a polygonal blank, such as the blank 20, to uniform marginal pressure coincident with central doming of the blank to squeeze the marginal portions of the blank to substantially thinner tapered form while leaving the central portion of the blank at least in the original thickness of the blank and preferably somewhat thickened by displacement of some of the metal from the marginal portion of the blank toward the center. Preferably, the edges of the coined blank intermediate the corners of the original blank are radially extended beyond the original outline of the blank so that maximum use is made of the material in the blank and only corner portions need be trimmed away as scrap to provide a circular button ready to be cupped and drawn into a cartridge case. Suitable dies for the coining operation are illustrated in my copending application, Serial No. 292,158, filed June 6, 1952.

Figures 3 and 4 illustrate the blank at the finish of the coining operation. As there shown, the upper surface of the coined blank 21 has a circular convex-concave dome portion 22 the periphery of which is defined by an annular groove 23. After trimming off the corner portions 24 lying outside of the annular groove 23, the button 25, such as shown in Figure 5, is obtained. Said button, or coin, 25, is circular in shape, with the central dished portion, as at 26, thicker than the marginal portion 27, the wall of the coin tapering gradually outwardly toward said marginal portion 27. Preferably, the surfaces joining the central portion 26 and the periphery of the marginal portion 27 are frusto-conical. A very important feature resides in so trimming the circular periphery of the blank that in subsequent cupping and drawing, any formation of a laterally radially outwardly projecting hump on the outer side of the edge of the cup will be avoided. To this end, the circular periphery of the coined blank, as shown in Figure 5, is trimmed to afford an acute angle bevel 28 between the dished side and the bulged side of the blank. Thus, the diameter of the peripheral edge of the blank on the dished side is smaller than that on the opposite, or bulging, side of the blank. This differential is indicated by the space 29 between the lines drawn vertically from these inner and outer edges. Preferably, the diametrical differential between the two edge of the coined blank are approximately 0.003 to 0.0035 inch in a blank having a peripheral edge that is approximately 0.375 inch in thickness.

The coining operation requires about 75 to 100 tons per square inch. The weight of each round coin 25 is 6.97 pounds, assuming an initial weight of 9.40 pounds as given above, and the weight of the trim is 2.43 pounds. Typically, the dimensions of the coin 25 after trimming are: a diameter of 7.718" and a total height of 1 28/32".

After being coined, the blank is annealed in a salt bath for fifteen minutes at a temperature of 1225 to 1275°, preferably at 1275° F., and hot water quenched at 200° F. After coining, but before annealing, the grain size was 7 to 8, while after annealing, the grain size was 8 to 10. The hardness of the coined blank after annealing was substantially the same as before the coining operation, namely between 79 and 82 Rockwell B hardness.

The coined blank 25 is next cupped to form a cupped blank 30, as shown in Figure 6. The cupping operation is carried out by pressing the blank 25 through a draw die by means of a cupping punch that drives into the dished center portion 26 of the blank 25. This causes the marginal portion 27 of the blank to be warped into substantially cylindrical form as the marginal portion is drawn through the die. As a result of the progressive diminishing thickness of the blank toward the marginal portion 27 of the coined blank 25, and of the beveling at 28 of the edge thereof to the extent indicated in Figure 5, the upper edge portion of the cupped blank at Figure 6 remains of substantially uniform thickness throughout the cupping operation and without the formation of a lateral outward bulge such as is experienced when conventional methods are used. The edge of the cupped blank 30 assumes a bevel, as indicated at 31, that slopes from the inside downwardly and outwardly, as shown in Figure 6. This substantially facilitates the subsequent drawing operations, since it eliminates the lamp that is conventionally formed in the usual methods of drawing. Such conventionally formed hump develops a resistance to the draw, with a resultant hardening of the metal at the edge of the blank and consequently at the edge of the cup. The result is that the edge is likely to crack and become uneven so that it must be trimmed. The outward bevel 28 as shown in Figure 5 tends to eliminate any such difficulty and is valuable in that in subsequent draws, as the cup is elongated into the desired case form, the bevel gradually straightens out as the metal is pulled or drawn into the elongated form. A more uniform cup is obtained economically and without waste.

At the finish of the cupping operation, each cupped blank has a length of about 3 5/8 inches, assuming the initial weight of the coin and the initial dimensions of the blank to be those already specified.

The cupped blank of Figure 6 is then salt bath annealed for fifteen minutes at about 1275° F. and quenched in hot water at 200° F. The hardness after the cupping operation was 92 to 99 Rockwell B hardness, but after the anneal it had dropped to between 82 and 85 B.

After the cupping and annealing step, the annealed blank is again processed in order to coat its surfaces properly for the subsequent drawing operation. It will be understood without specifically so stating that a similar surface processing and coating operation is carried out between each successive draw.

In the first draw, the cupped blank of Figure 6 is drawn to a length of about 5 7/16 inches with a 45% reduction in wall thickness. The resulting cup, indicated by the reference numeral 32, is illustrated in Figure 7. As there shown, the external surface of the side wall 33 is truly cylindrical, while the side wall itself is slightly tapered upwardly so as to be thinner at its upper peripheral edge 34. Said upper edge 34, due to the flow of metal in the drawing step, has a slightly inner and outer bevel, as at 35 and 36, respectively, but is generally regular in outline and free from "dog ears," such as might result from improper drawing conditions or from the use of a steel not suited for the drawing operation. Toward the head end of the cupped blank 32, the wall increases in thickness to provide a thicker, but uniformly rounded end wall 37. The external diameter of the blank between the cupped form 30 of Fig. 6 and the first draw form 32 of Fig. 7 is reduced, as, for instance from a diameter of 5.120 inches for the cup to a diameter of 4.550 inches for the first draw.

Following the first draw, the blank is again annealed in a salt bath for fifteen minutes at 1275° F. and quenched in hot water at 200° F.

The hardness after the first draw was 93 to 97 Rockwell B hardness, and after the following anneal was 80 to 86 B. The grain size remained about the same, namely, from 9 to 10.

In the second draw, the blank from the first draw was drawn to a length of 7 15/16 inches and an external diameter of 4.240 inches, with a 35% reduction in wall thickness. The second draw is illustrated by the blank 38 of Fig. 8.

The blank 38 is next annealed in a salt bath for fifteen minutes at 1275° F. and quenched in hot water at 200° F.

The hardness after the second draw was 92 to 96 Rockwell B hardness, and after the following anneal was 80 to 86 B. The grain size remained at from 9 to 10.

In the third draw, the blank 38 is drawn to the form of the blank 39 illustrated in Figure 9. Said blank 39, typically, has a diameter of 4.130 inches and is trimmed, if necessary, to a total length of 10 5/16 inches. Its weight at this point is 6.5 pounds. A 36% reduction in wall thickness has been effected between the blank 38 and the blank 39 in the third draw.

After the third draw, the blank is again salt bath annealed for fifteen minutes at 1275° F. and quenched in hot water at 200° F. The hardness after the third draw was 90 to 96 Rockwell B, and after the following anneal was 81 to 84 B. The grain size remained at about 10.

The blank 39 is again subjected to a drawing operation to produce after the fourth draw the blank 40 of Figure 10. In this fourth draw a 36% reduction in wall thickness is effected. Typically, the dimensions of the fourth draw blank 40 are 4.010 inches external diameter and 15 5/16 inches total height.

Following the fourth draw, the blank 40 is salt bath annealed for fifteen minutes at 1275° F. and quenched in hot water at 200° F.

The hardness of the blank after the fourth draw was 90 to 97 B, and after the anneal was 81 to 84 B. The grain size still remained about 9 to 10.

Following the fourth draw, the blank 40 is subjected to a pre-heading operation, the result of which is illustrated in Figure 11 by the head end 41. The further working that is represented by the head end 41 comprises somewhat flattening the bottom wall 42 and providing the same with a central embossment or button-like thickening 43 that projects downwardly. Simultaneously, part of the metal is displaced from an annular intermediate area 44 into an annular, outer marginal, downwardly projecting rib 45. Just above said annular outer and downwardly projecting rib portion 45, the head end is slightly constricted in diameter to provide a generally cylindrical portion 46, which is joined to the outer cylindrical wall surface 47 by a beveled portion 48. The contour of the head portion as shown in Figure 11, after the pre-heading operation, is peculiarly well adapted for the subsequent drawing and heading operations, constituting the fifth draw and the final heading step. The pre-heading operation thus gets the metal started into place for the finished head.

In the fifth draw, following the pre-heading operation just described, there is a 40% reduction in wall thickness; the external diameter remains the same at 3.859 inches, but the over-all length is increased to 23⅞ inches after any trimming step that may be necessary.

After the fifth draw, the hardness is between 98 and 101 Rockwell B. No annealing is carried out after the fifth draw.

The form of the blank after the fifth draw is that illustrated in Figure 12 by the blank 49. It will be noted that the head end 50 of the blank 49 represents some change in the contour of the head from that shown in Fig. 11, particularly with respect to the radially outward displacement of metal to eliminate the reduced cylindrical portion 46 and provide a straight cylindrical lower end wall 51 as a smooth continuation of the wall 52 of the casing blank.

After the fifth draw, the blank 49 is subjected to a heading operation to provide a head end 53 having a base flange 54. The heading step is carried out without an anneal between it and the fifth draw. Consequently, the hardness of the base, or head end, 53 is increased somewhat due to the cold working in the heading operation, and, in general, the hardness of said head end will range between 101 and 105 Rockwell B. Actual hardness measurements at different points of the base and side wall adjoining the base will be given in connection with the description of Figures 15 and 16. The hardness of the head end of the cartridge case at this point is from 6 to 10 units Rockwell B hardness harder than would be the case had a spheroidized steel been used as the starting material. This increased hardness in the case of a pearlitic steel microstructure makes for a stronger head than in the case of a spheroidized steel and thus eliminates one of the frequent causes of trouble during firing of the cartridge case, namely, fracturing of the metal in or adjacent to the head end, or at the juncture between the thickened side wall portion, as at 55, and the head end.

At the end of the heading operation, the diameter of the head end across the flange 54 is about 4.400 inches, while the height, or length, of the case is slightly reduced, as to 23⅝ inches from 23⅞ inches after the fifth draw.

After the heading operation, the primer hole 56 is formed centrally of the head end, as by a piercing operation. The headed blank is then subjected to heat treatment to stress-relieve the metal, as by subjecting the headed blank to immersion in a salt bath maintained at 650° F. for around six and one-half minutes. This insures greater uniformity of stresses and of properties throughout the headed blank. This heat treatment also increases the hardness by approximately 3 to 5 Rockwell B units. At this point, then, there is substantial uniformity throughout the case from the tip of the primer boss 57 through the base or head end and out the side wall of the case.

Next, after conventional washing, rinsing, spray or dip pickling and spray or dip lubricating, the headed blank 53 of Figure 13 is subjected to a tapering and necking operation, which gives desired taper to the case, brings the side wall of the case to a substantially true circular cross section, and provides a tapered neck portion 59. The resulting tapered and necked case is indicated by the reference numeral 60. The head end is not changed during this tapering and necking operation.

The casing 60 is next cleaned for machining and then the base is machined to the form and contour illustrated in Figure 17, the base end there being indicated by the reference numeral 61. At the same time the primer hole 56 is completed and tapped, as at 62. Due to the fact that the steel of the base is pearlitic in microstructure, the machining is easier than where the case has been made from a spheroidized steel. In the latter case, the chips tend to be "gummy" and seem to be produced by a tearing action, whereas in the case of pearlitic steel, there is a true cutting action during the machining operation.

After machining and tapping the primer hole, the case is again cleaned and dried, and then mouth annealed, as by means of an induction heating device or salt bath, to reduce the hardness of the metal at the neck end of the case. Actual hardness measurements are shown in Figures 15 and 16.

After the mouth annealing operation, the mouth is sized by the use of a plug, or arbor, and pressed, and the case is then given a suitable external coating, such as a zinc plate followed by an ano-zinc coating of the chromate type to prevent flocculation of the zinc. The case is then inspected and stamped.

Figure 17 also illustrates the grain direction in the head and 61 of the finished case. As there shown, the grain lines, indicted by the reference numeral 63 in the base run generally parallel to the flat surfaces of the base and follow the contours, as at 64, of the inner surface of the primer boss 66, and also follow the inner contour 67 of the juncture between the inner base surface 68 and the thickened side wall portion 69, these latter grain lines being indicated by the reference numeral 70. The more or less unbroken continuity of the grain lines, starting in the primer boss with the grain line portions 64, extending radially outward as the line portions 63 and joining the upwardly, smoothly curved grain line portions 70 into the thickened wall portion 69, is probably responsible for the exceptionally good performance of the cartridge cases of my invention under actual firing conditions.

Figures 15 and 16 show diagrammatically a longitudinal half of the finished cartridge case, with actual Rockwell B hardness values indicated at the various spots where hardness tests were run. In Figure 16, the region A, which extends for a minimum of about 0.32 inch from the end of the case, shows hardness measurements varying from 101 to 105. The next adjacent region T, which represents the thickened wall portion joining the base and the side wall where most of the cold work was done, shows a Rockwell B hardness varying between 104 and 106. The next adjoining wall portion, region B, which extends for a minimum of 2.5 inches and a maximum of 2.9 inches from the region T, shows Rockwell B hardness values between 101 and 104. There is then an adjoining short region, S, of a maximum length of 0.25 inch, where the readings are 100 to 101, followed by an upper region C with readings between 100 and 103. Above that, in the neck region N the readings vary between 73 at the very top, or rim of the casing, to 103 at the junction between the regions N and C. The region N, which should have a maximum length of about four inches, includes an upper region D, having a minimum length of 1.5 inches. The lower degree of hardness in the region D is of extreme importance and is obtained as a result of the mouth annealing operation previously described.

The following table gives physical properties in the regions indicated by reference to Figures 15 and 16 that are typical of the pearlitic steel cartridge case made by the method described above and without any heat treatment step to effect hardening of the steel:

Region B1:—Yield strength, 115,000 lbs. p.s.i. Tensile strength, 129,618 lbs. p.s.i. Elongation, 6.5% in 1″
Region B2:—Yield strength, 115,500 lbs. p.s.i. Tensile strength, 130,870 lbs. p.s.i. Elongation, 7.3% in 1″
Region C1:—Yield strength, 101,500 lbs. p.s.i. Tensile strength, 120,788 lbs. p.s.i. Elongation, 6.3% in 1″

As a result of my invention, 3 inch/50 cartridge cases made from pearlitic steel have been satisfactorily produced and have actually been tested on the providing grounds. With standard loads, my cartridge cases have proved to be entirely satisfactory as they all re-chamber perfectly. Satisfactory firing of my cartridge cases has also been carried out at loads substantially higher than standard and at temperatures ranging from —20° F. to plus 120° F. To the best of my knowledge the cartridge cases of my invention are the first to have been made satisfactorily from pearlitic steel. Further, my cartridge cases are the finest ever fired; they are going far beyond the present standards. One remarkable property of my cases is their elasticity, which is evidenced by their ability to return to their former dimensions after being stretched or expanded during firing. Spheroidized steel cartridge cases take a permanent set under firing loads that are easily withstood by my cases.

Although it is preferred that the various annealing steps be carried out by the use of molten salt baths, other media can be employed, but generally with less satisfactory results. For instance, the annealing between draws may be carried out in an air annealing furnace. In that case, the blanks are held in the furnace at a temperature of from 1225 to 1275° F., preferably at 1275° F., for about one and one-quarter hours, before cooling. An air furnace anneal is thus slower than a salt bath anneal. It also results in less uniform results, and, in practice, has given lower hardness values with accompanying lower tensile strength in the finished cartridge case.

By way of example, starting with coined blanks prepared from the same heat of steel and processed in the same manner as described in connection with the coined blank 21, I have found that if air furnace annealing be substituted for the salt bath anneals hereinbefore described, the yield and tensile strength of the finished cartridge case are 6 to 7,000 p.s.i. lower and the hardness 2 to 4 Rockwell B units lower than those given in the above table.

It will be understood that modifications and variations may be effected without departing from the scope of the novel concepts of the present invention.

I claim as my invention:

1. The method of making one-piece integral cartridge cases and like hollow cylindrical articles closed at one end and open at the other, which comprises subjecting a blank of non-spheroidized steel of about 0.30% carbon to immersion in a salt bath maintained at from 1525 to 1565° F., thereafter immediately immersing said blank in a salt bath maintained at about 1100° F. until the blank has reached the temperature of said latter bath, withdrawing said blank from said latter bath and quenching the same under conditions equivalent to quenching in water at 200° F. to produce a purely pearlitic steel having a grain size of from 8 to 10 and a hardness of from 79 to 82 Rockwell B, thereafter subjecting said blank to coining, cupping and successive drawing steps to effect cold reductions of said blank and form the same into an integral hollow cylindrical article closed at one end and open at the other and annealing said blank after said coining step and after each of the successive drawing steps except the final drawing step, said steel after the final drawing step and as a result thereof having a hardness of from 101 to 105 Rockwell B at the closed end of said blank.

2. The method of making one-piece integral cartridge cases and like hollow cylindrical articles closed at one end and open at the other, which comprises subjecting a blank having a thickness of at least 0.5 inch of non-spheroidized medium carbon steel in its as-received condition from the mill to immersion in a salt bath maintained at about 1550° F. for about ten minutes, thereafter immediately immersing said blank for about five minutes in a salt bath maintained at about 1100° F. until the blank has reached the temperature of said latter bath, withdrawing said blank from said latter bath and quenching the same under conditions equivalent to quenching in water at 200° F. to produce a purely pearlitic steel having a grain size of from 8 to 10 and a hardness of from 79 to 82 Rockwell B, thereafter subjecting said blank to coining, cupping and successive drawing steps to effect cold reductions of said blank and form the same into a hollow cylindrical article closed at one end and open at the other and annealing said blank after said coining step and after each of the successive drawing steps except the final drawing step, said steel after the final drawing step and as a direct result thereof having a hardness of from 101 to 105 Rockwell B.

3. In the making of one-piece integral cold drawn cartridge cases and like articles from a non-spheroidized medium carbon steel having initially a purely pearlitic structure, a grain size of 8 to 10 and a Rockwell B hardness of from 79 to 82, the steps which comprise successively subjecting said steel to cold drawing steps to effect successive reductions thereof, and annealing said steel after each successive cold drawing step except the final drawing step, whereby the steel after the final draw has a substantially pearlitic structure and a Rockwell B hardness of about 101 to 105.

4. In the making of one-piece integral steel cartridge cases from a coined blank of a non-spheroidized steel of about 0.30% carbon having initially a purely pearlitic structure, a grain size of 8 to 10 and a Rockwell B hardness of from 79 to 82, the steps which comprise successively subjecting said coined blank to cold drawing steps to effect successive reductions thereof, and annealing said steel after each successive cold drawing step except the final drawing step, whereby the steel directly after and as a result of the final drawing step has a Rockwell B hardness of about 101 to 105.

5. In the method of making one-piece integral cartridge cases and like hollow cylindrical articles closed at one end and open at the other from a non-spheroidized steel of about 0.30% carbon content, including in the sequence named a coining, a cupping and at least four drawing steps, the improvement whereby the ductility of the steel is increased which comprises prior to said coining step isothermally annealing the steel in its initial state to convert its microstructure to pearlitic having a grain size of from 8 to 10 and a hardness of about 79 to 82 Rockwell B, and prior to said cupping and after each drawing step except the final drawing step subjecting said steel to a temperature of about 1275° F. in a salt bath and thereafter quenching said steel to anneal the same without substantial change in grain size and hardness from that of said steel immediately following said isothermal annealing step.

6. In the making of one-piece integral cartridge cases by a series of cold working steps from a non-spheroidized steel of about 0.30% carbon content having at the start of the first cold working step a purely pearlitic structure, a grain size of 8 to 10 and a Rockwell B hardness of 79 to 82, the improvement which comprises carrying out the following steps in the sequence indicated while retaining substantially a pearlitic structure:

(1) Coining;
(2) Annealing;
(3) Cupping;
(4) Annealing;
(5) Successive drawing with subsequent annealing;
(6) Pre-heading;
(7) Final drawing with no subsequent anneal;
(8) Heading;
(9) Tapering and necking;
(10) Machining base;
(11) Mouth annealing and sizing;

said steps being carried out without any heat treatment at any stage to effect hardening of the steel yet the base region of the final cartridge case having a hardness of between 101 and 105 as a result of the cold working effected in the final drawing step.

7. In the making of one-piece integral cartridge cases by a series of cold reduction steps from a non-spheroidized medium carbon steel in a non-spheroidized as-received-from-the-mill state, which comprises subjecting a blank of said steel to immersion in a salt bath maintained at from 1525 to 1565° F., thereafter immediately immersing said blank in a salt bath maintained at about 1100° F. until the blank has reached the temperature of said latter bath, withdrawing said blank from said latter bath and quenching the same under conditions equivalent to quenching in water at 200° F. to produce a purely pearlitic steel having a grain size from 8 to 10 and a hardness of from 79 to 82 Rockwell B, and thereafter subjecting said blank to the following steps:

(1) Coining;
(2) Annealing;
(3) Cupping;
(4) Annealing;
(5) Successive drawing with subsequent annealing;
(6) Pre-heading;
(7) Final drawing with no subsequent anneal;
(8) Heading;
(9) Tapering and necking;
(10) Machining base;
(11) Mouth annealing and sizing;

said steps being carried out without any heat treatment at any stage to effect hardening of said steel yet the base region of the final cartridge case having a hardness of between 101 and 105 directly as a result of the cold working effected in the final drawing step.

8. The method of making one-piece integral cartridge cases and like hollow cylindrical articles closed at one end and open at the other, which comprises subjecting a blank of non-spheroidized medium carbon steel consisting of ferrite and pearlite and having a grain size of 5 to 7 to immersion in a salt bath maintained at from 1525 to 1565° F., thereafter immediately immersing said blank in a salt bath maintained at about 1100° F. until the blank has reached the temperature of said latter bath, withdrawing said blank from said latter bath and quenching the same under conditions equivalent to quenching in water at 200° F. to produce a purely pearlitic steel having a grain size of from 8 to 10 and a hardness of from 79 to 82 Rockwell B, thereafter subjecting said blank to coining, cupping and successive drawing steps to effect cold reductions of said blank and form the same into an integral hollow cylindrical article closed at one end and open at the other and annealing said blank after said coining step and after each of the successive drawing steps except the final drawing step by subjecting said blank in a salt bath to a temperature of about 1275° F. followed by quenching, said steel after the final drawing step and as a result thereof having a hardness of from 101 to 105 Rockwell B at the closed end of said blank.

9. The method of making one-piece integral cartridge cases and like hollow cylindrical articles closed at one end and open at the other, which comprises subjecting a blank of a non-spheroidized steel of about 0.30% carbon content in its as-received condition from the mill to immersion in a salt bath maintained at about 1550° F. for about ten minutes, thereafter immediately immersing said blank for about five minutes in a salt bath maintained at about 1100° F. until the blank has reached the temperature of said latter bath, withdrawing said blank from said latter bath and quenching the same under conditions equivalent to quenching in water at 200° F. to produce a purely pearlitic steel having a grain size of from 8 to 10 and a hardness of from 79 to 82 Rockwell B, thereafter subjecting said blank to coining, cupping and successive drawing steps to effect cold reductions of said blank and form the same into an integral hollow cylindrical article closed at one end and open at the other and annealing said blank after said coining step and after each of the successive drawing steps except the final drawing step by subjecting said blank in a salt bath to a temperature of about 1275° F. followed by quenching, said steel after the final drawing step and as a direct result thereof having a hardness of from 101 to 105 Rockwell B.

10. In the making of one-piece integral cold drawn cartridge cases and like articles from a non-spheroidized steel having a carbon content of about 0.30% having initially a purely pearlitic structure, a grain size of 8 to 10 and a Rockwell B hardness of from 79 to 82, the steps which comprise successively subjecting said steel to cold drawing steps to effect successive reductions thereof, and annealing said steel after each successive cold drawing step except the final drawing step by holding said steel at about 1275° F. in a fused salt bath for about 15 minutes and immediately thereafter quenching said steel, whereby the steel after the final draw has also a pearlitic structure and a Rockwell B hardness of about 101 to 105.

11. In the making of one-piece integral cold drawn cartridge cases and like articles from a non-spheroidized steel of about 0.30% carbon content having initially a purely pearlitic structure, a grain size of 8 to 10 and a Rockwell B hardness of from 79 to 82, the steps which comprise successively subjecting said steel to cold drawing steps to effect successive reductions thereof, and annealing said steel after each successive cold drawing step except the final drawing step by holding said steel at about 1275° F. in a fused salt bath for about 15 minutes and immediately thereafter quenching said steel in hot water, whereby the steel directly after and as a result of the final drawing step has a Rockwell B hardness of about 101 to 105.

12. In the method of making one-piece integral hollow steel cartridge cases and like articles closed at one end and open at the other, the steps of subjecting a blank of non-spheroidized medium carbon steel consisting of ferrite and pearlite and having a grain size of about 5 to 7 to immersion in a molten salt bath maintained at a temperature slightly above the upper critical point of said steel until said blank has reached the temperature of said bath, thereafter immersing said blank in a molten salt bath maintained at a constant temperature substantially below said upper critical point and corresponding to a temperature of about 1100° F. for 0.30% carbon steel, withdrawing said blank from said latter bath when at the temperature thereof and quenching the blank under conditions equivalent to quenching in water at 200° F. to produce a purely pearlitic steel having a grain size of about 8 to 10.

13. In the method of making one-piece integral hollow steel cartridge cases and like articles closed at one end and open at the other, the steps of subjecting a blank of non-spheroidized 0.30% carbon steel consisting of ferrite and pearlite and having a grain size of about 5 to 7 to immersion in a molten salt bath maintained at a temperature slightly above the upper critical point of said steel until said blank has reached the temperature of said bath, thereafter immersing said blank in a molten salt bath maintained at a constant temperature of about 1100° F., withdrawing said blank from said latter bath when at the temperature thereof and quenching the blank under conditions equivalent to quenching in water at 200° F. to produce a purely pearlitic steel having a grain size of about 8 to 10.

References Cited in the file of this patent

UNITED STATES PATENTS

| | | |
|---|---|---|
| 2,103,834 | Tyson | Dec. 28, 1937 |
| 2,184,624 | Raab et al. | Dec. 26, 1939 |

(Other references on following page)

UNITED STATES PATENTS

| | | | |
|---|---|---|---|
| 2,264,266 | Jacobs et al. | Nov. 25, | 1941 |
| 2,531,731 | Hibbert | Nov. 28, | 1950 |
| 2,535,284 | Harris | Dec. 26, | 1950 |

FOREIGN PATENTS

| | | | |
|---|---|---|---|
| 390,999 | Great Britain | Apr. 20, | 1933 |

OTHER REFERENCES

Metal Progress A, January 1943, pp. 51–52.

Stamping and forming Section of Heat Treating and Forging For, May 1943, pages 236–241.

Metal Progress, January 1945, pages 67–74.

"Metal Progress" B, March 1945, pp. 492–496.

"Metal Progress" A, January 1949, pp. 51–52.

Atlas of Isothermal Transformation Diagrams, U.S. Steel, 1951, pages 1 to 30.

Atlas of Isothermal Transformation Diagrams, U.S. Steel (supplement), 1953, page 3.